(12) United States Patent
Junior

(10) Patent No.: US 12,233,864 B2
(45) Date of Patent: Feb. 25, 2025

(54) NAVIGATION METHOD AND SYSTEM INCLUDING SEGMENTATION OF A ROUTE INTO POLYGONAL FORMS

(71) Applicant: Robert Bosch Limitada, Campinas SP (BR)

(72) Inventor: Marcelo Sedoski Junior, Curitiba PR (BR)

(73) Assignee: Robert Bosch Limitada, Campinas SP (BR)

(*) Notice: Subject to any disclaimer, the term of this patent is extended or adjusted under 35 U.S.C. 154(b) by 1 day.

(21) Appl. No.: 17/767,631

(22) PCT Filed: Oct. 13, 2020

(86) PCT No.: PCT/BR2020/050408
§ 371 (c)(1),
(2) Date: Jun. 28, 2022

(87) PCT Pub. No.: WO2021/068050
PCT Pub. Date: Apr. 15, 2021

(65) Prior Publication Data
US 2024/0101108 A1    Mar. 28, 2024

(30) Foreign Application Priority Data

Oct. 10, 2019    (BR) .................. 10 2019 021266-7

(51) Int. Cl.
*G05D 1/24*    (2024.01)
*A01B 69/04*    (2006.01)
(Continued)

(52) U.S. Cl.
CPC ........... *B60W 30/10* (2013.01); *A01B 69/008* (2013.01); *G01C 21/3415* (2013.01); *G05D 1/24* (2024.01)

(58) Field of Classification Search
CPC ................ B60W 30/10; A01B 69/008; G05D 1/0061; G05D 1/0088; G05D 1/021;
(Continued)

(56) References Cited

U.S. PATENT DOCUMENTS 9,389,088 B2    7/2016    Kalai et al.
9,736,646 B2    8/2017    Spears et al.
(Continued)

FOREIGN PATENT DOCUMENTS

CN    102062864 A    *    5/2011
CN    103185593 A    *    7/2013
(Continued)

OTHER PUBLICATIONS

CN 102062864 A—Machine Translation (Year: 2011).*
CN 103185593 A—Machine Translation (Year: 2013).*
CN 103644922 A—Machine Translation (Year: 2014).*
CN 106643756 A—Machine Translation (Year: 2017).*
CN 108037519 A—Machine Translation (Year: 2018).*
(Continued)

*Primary Examiner* — Dino Kujundzic
(74) *Attorney, Agent, or Firm* — Michael Best & Friedrich LLP

(57) ABSTRACT

This invention refers to a navigation method applicable to general transport means—air, maritime or land transport—, particularly whenever constant checking on the route or path is required for taking a certain action. This invention also describes a system that uses said method.

8 Claims, 2 Drawing Sheets

(51) Int. Cl.
  *B60W 30/10*     (2006.01)
  *G01C 21/34*     (2006.01)
(58) Field of Classification Search
  CPC .............. G05D 1/0214; G05D 1/0221; G05D
         1/0223; G01C 21/3415; G01C 21/3476
  See application file for complete search history.

(56) References Cited

U.S. PATENT DOCUMENTS

| | | | |
|---|---|---|---|
| 10,422,639 B2 | 9/2019 | Yang | |
| 2009/0063042 A1* | 3/2009 | Santesson | .......... G01C 21/3889 |
| | | | 701/533 |
| 2019/0146513 A1 | 5/2019 | Tomito et al. | |

FOREIGN PATENT DOCUMENTS

| | | | | | |
|---|---|---|---|---|---|
| CN | 103644922 A | * | 3/2014 | ......... | G01C 21/3407 |
| CN | 106643756 A | * | 5/2017 | | |
| CN | 108037519 A | * | 5/2018 | ............. | G01S 19/37 |
| CN | 109508034 A | | 3/2019 | | |
| JP | 2022183692 A | * | 12/2022 | | |

OTHER PUBLICATIONS

JP 2022183692 A—Machine Translation (Year: 2022).*
Translation of International Search Report for Application No. PCT/BR2020/050408 dated Jan. 8, 2021 (3 pages).
Translation of International Preliminary Report on Patentability for Application No. PCT/BR2020/050408 dated Jun. 17, 2021 (5 pages).

\* cited by examiner

NAVIGATION METHOD AND SYSTEM INCLUDING SEGMENTATION OF A ROUTE INTO POLYGONAL FORMS

BACKGROUND

This invention refers to a navigation method applicable to general transport means-air, maritime or land transport-, particularly whenever constant checking on the route or path is required for taking a certain action. Such action can vary from a further route correction by using the method disclosed herein to any other actions in agricultural implements, for instance. This invention also describes a system that uses said method.

In various transport means, being in route is crucial to achieve a certain mis-sion by said transport mean. So, a constant checking is required to determine if the vehicle is in route or underwent a deviation, or even to allow taking some action.

For instance, in the field of aviation, the flight trajectory of an aircraft is previously determined by the flight plan, while, in the maritime navigation, it is determined by the navigation chart. In addition to being permits before the relevant authorities to make trips by air or by sea, such documents necessarily indicate the trajectory to be kept by the vehicle to ensure safety both to itself and to third parties during the travel.

Some small deviations from the route, possibly resulting from a lateral air current on an aircraft, or from a maritime current on a vessel, may imply a significant deviation from destination, and the longer is the distance up to the final destination, the bigger is such deviation.

Therefore, a manner to perform this kind of real-time checking concerns a methodology of trajectory discretization by sub-dividing it into small adjacent areas. These discrete areas are more easily compared to the coordinates of the object, to identify if said object position is or not inside the relevant discrete area.

Another kind of application to this methodology for checking if an object is located in a certain area refers to the agricultural domain. In the agriculture, the trajectory is of paramount relevance for an improved yielding through optimization of the land and prevention of waste of agricultural inputs, such as seeds, manure, and fertilizers. This optimization can only be achieved by using techniques that ensure the prior definition of trajectories and geolocation coordinates.

Sowing is one of the most critical steps in vegetable culture, as it is determi-nant to the yield obtained by the farmer; thus, sowing must be really optimal. Optimization results from the use of row planting techniques, where the plants are arranged in rows. This method facilitates the flow inside the crop, and places all the vegetable in such a manner as to allow each of them removing from soil the precise content of nutrients as needed to a healthy growth, without invading the other's space through its roots and taking nutrients from the neighbor vegetable. For such, the technology of agricultural ma-chinery allows it to deposit each seed in the soil at a previously defined distance from the other.

Additionally, in the use of the row planting technique intended to obtain the best yields for the whole crop, crossings of rows can take place. This specific situation can be critical, as an imperfect crossing may give rise to real risks of overlapping seeds and other agricultural inputs, with a consequent inefficiency in the sowing and waste of seeds, manure, and fertilizers.

Nevertheless, to avoid duplicity or overlap of agricultural inputs in case of such crossing, some techniques are implemented through highly complex algorithms, that represent expensive costs with the planting systems incorporated to agricultural machines.

One of the manners to identify if the spot to be planted is located in the intersection is the use of a technique to discretize the trajectory into small adjacent polygons containing areas, thus checking if a certain spot previously planted belongs to any of these areas. This well-known technique starts by identifying the spot one intends to determine if it belongs to the trajectory. Once identified the spot, an infinite line is drawn from it, from the left to the right. This technique considers the number of times the line intercepts the polygon. If the line only intercepts the polygon once, then the spot is inside the polygon. Whenever the line intercepts the polygon twice or never, then the spot is outside the polygon, thus indicating that said spot would be outside an intersection of plant rows. However, according to the spot position and to the geometry of the polygon, the spot can be outside the polygon and intercept it in a single spot-a vertex-, in which case the technique shall possibly induce a "false positive" response (erroneous indication of a result, given that the correct indication should be precisely the opposite).

In this technique, the application of correction filters to eliminate possible mis-takes and to reach a very quick and accurate result requires the use of an extremely big and robust processing unit, as the mathematical calculations behind said technique are highly complicated. And the use of big and robust processing units can represent a limi-tation in terms of costs, dimension and/or weight, thus compromising its feasibility in a certain application.

For instance, in applications for seeder machines, where the number of planting rows uses to be very significant and each row is activated by a motor reductor-type electromechanical equipment, each group of motor reductors (usually around 5 or 6) is controlled by a control and processing unit ("artificial intelligence" of electromechanical activations) that can, among other functions, control the non-deposition of seeds in lands where they had been previously planted, thus preventing the formation of overlapped planting zones. And the bigger is the number of data to be processed, the bigger is the processing unit, which implies an increased unit price at the same proportion.

In view of the above, and considering that the existing techniques for determining if a certain object is placed inside some area require a series of highly complex calculations to avoid "false positive" results, as well as an extremely robust, large and expensive processing unit, the solution disclosed herein intends to circumvent all the aforesaid inconveniences, by using an extremely simple and cost saving technique to determine if an object is inserted in a certain area of a polygon.

SUMMARY

This invention is intended to provide a navigation method, whenever a continuous, quick, and accurate checking is required to determine if a certain spot (or more) is inserted in said route or placed outside it. Such method is applicable to sea, air and land navigation systems, as well as to planting systems, where real-time checking about the trajectory of agricultural implements is needed to avoid formation of overlapped planted areas.

Additionally, this invention is intended to provide a navigation system by using a navigation method whenever a continuous, quick, and accurate checking is required to determine if one or more sites are inserted in said route or outside it. Such method is applicable to sea, air and land navigation systems, as well as to planting systems, where real-time checking about the trajectory of agricultural implements is needed to avoid formation of overlapped planted areas.

To circumvent the inconveniences listed by the state of art, this invention described a navigation method that comprises determining the position of one element in relation to a certain route traversed by a transport mean, wherein said method comprises the steps of:
  registering the route of a transport mean by using a navigation device;
  identifying the position of the element;
  segmenting the route into a plurality of polygonal forms comprising at least four vertexes through a processing mean;
  checking the space relation between the element and the polygonal form through a processing mean;
  output a result as to the element position in relation to the polygonal form; and
  performing a certain action according to the result as to the element position in relation to the polygonal form.

In a first alternative embodiment, this invention describes a navigation method wherein the polygonal forms are placed adjacent to each other.

In a second alternative embodiment, this invention describes a navigation method wherein the step of segmenting the route into a plurality of polygonal forms through a processing tool comprises dividing the route of the transport into a plurality of adjacent polygonal forms, wherein each polygonal form comprises a limiting perimeter containing a sequence of adjacent spots.

In a third alternative embodiment, this invention describes a navigation method wherein the polygonal form comprises a quadrilateral containing an internal area.

In a fourth alternative embodiment, this invention describes a navigation method wherein the polygonal form comprises a convex quadrilateral.

In a fifth alternative embodiment, this invention describes a navigation method wherein the step of checking the space relation between the element and the polygonal form through a processing tool comprises the steps of:
  dividing the polygonal form through a first diagonal line that binds two opposite vertexes of said quadrilateral, so as to include a first triangle with a first vertex, a second vertex, a third vertex, and connected to a first triangle area, and a second triangle with a first vertex of the second triangle, a second vertex of the second triangle and a third vertex of the second triangle and connected to a second triangle area;
  binding the element to the vertexes of the first triangle, so as to comprise a third triangle, a fourth triangle, and a fifth triangle;
  binding the element to the vertexes of the second triangle, so as to comprise a sixth triangle, a seventh triangle and an eight triangle;
  calculating the areas of the third triangle, of the fourth triangle, of the fifth triangle, of the sixth triangle, of the seventh triangle, and of the eight triangle;
  comparing the area of the first triangle to the result from the first sum of areas of the third triangle, of the fourth triangle and of the fifth triangle;
  comparing the area of the second triangle to the result of the second sum of areas of the sixth triangle, of the seventh triangle and of the eight triangle;
  processing the result from the comparison between the areas of the first triangle and the first sum of areas, as well as the result from the comparison between the areas of the second triangle and the second sum of areas.

In a sixth alternative embodiment, this invention describes a navigation method wherein the output result comprises one of the two alternatives: either the element is connected to the internal area of the polygonal form, or the element is dissociated from the internal area of the polygonal form.

Moreover, this invention describes a navigation system that comprises determining the position of an element in relation to a certain route, wherein the system comprising:
  a navigation device;
  at least one mean to determine the position of objects;
  at least a processing tool.

In a first alternative embodiment, this invention describes a system wherein the navigation device comprises a Cartersian plane.

In a second alternative embodiment, this invention describes a system wherein the object positioning device comprises at least a tool to determine and/or identify the element position.

DETAILED DESCRIPTION

Figure 1:
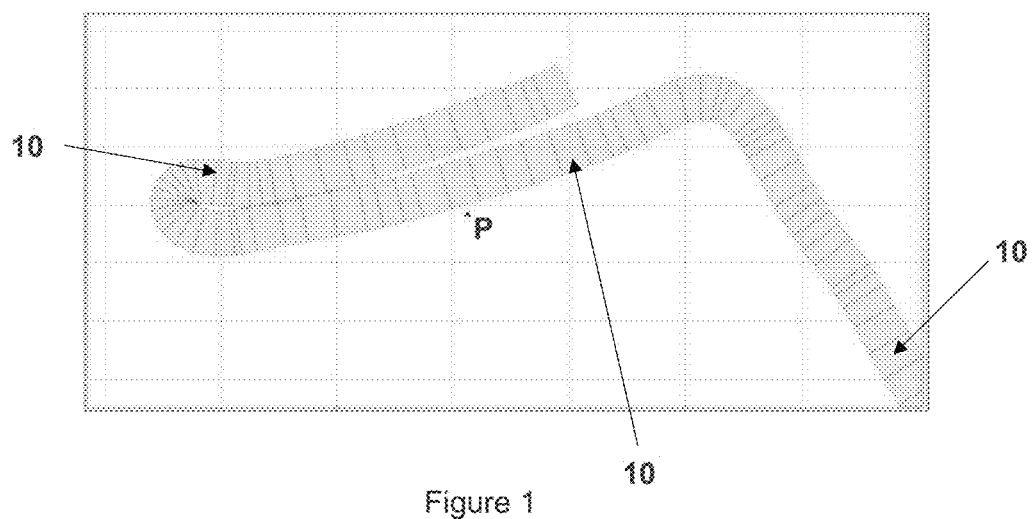
FIG. 1—Illustrative scheme of the navigation method according to this invention.
Figure 2:
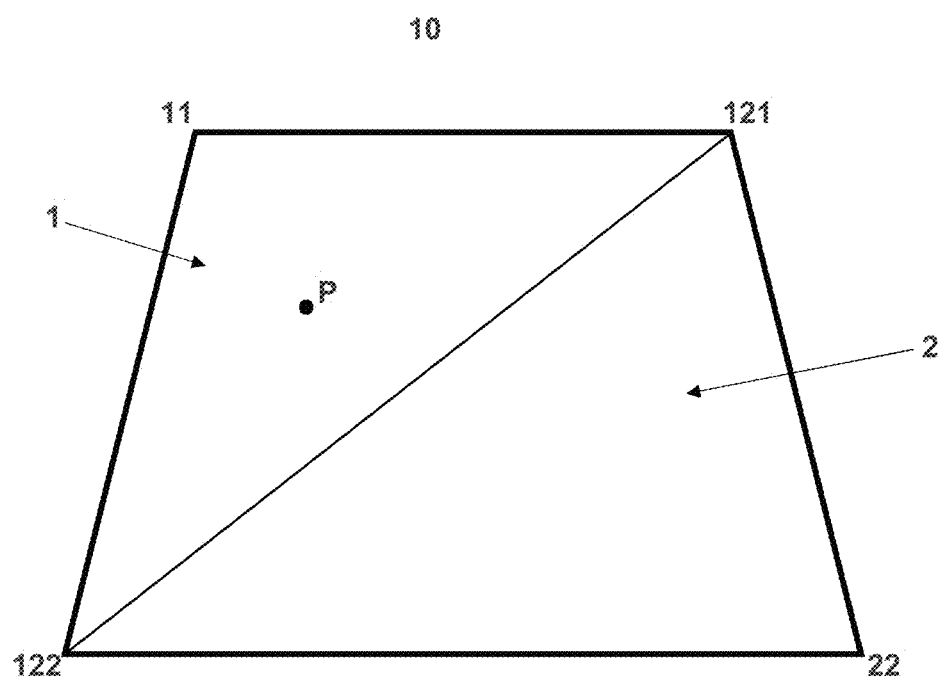
FIG. 2—Illustrative scheme of the navigation method according to this invention.
Figure 3:
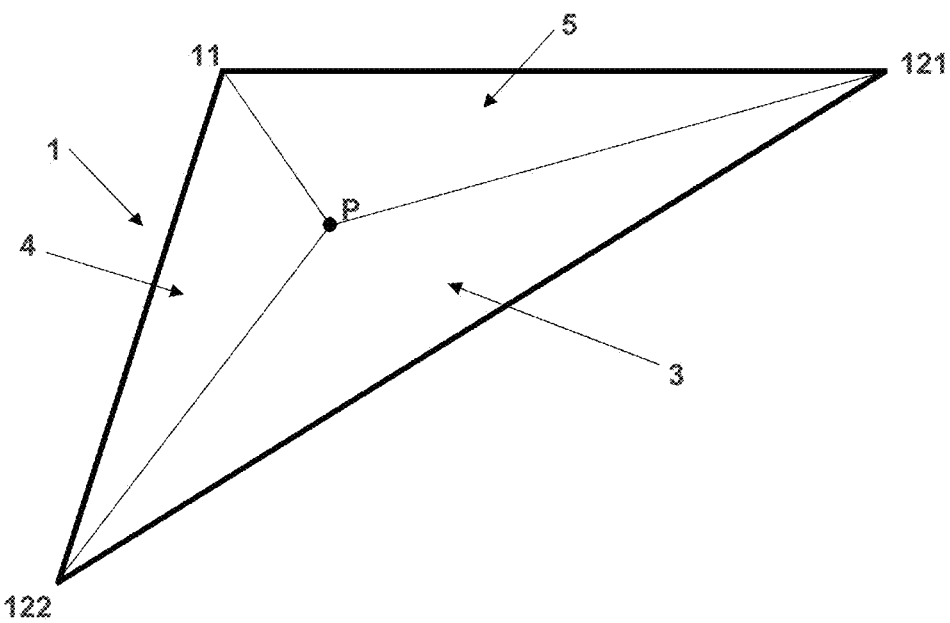
FIG. 3—Illustrative scheme of the navigation method according to this invention.
Figure 4:
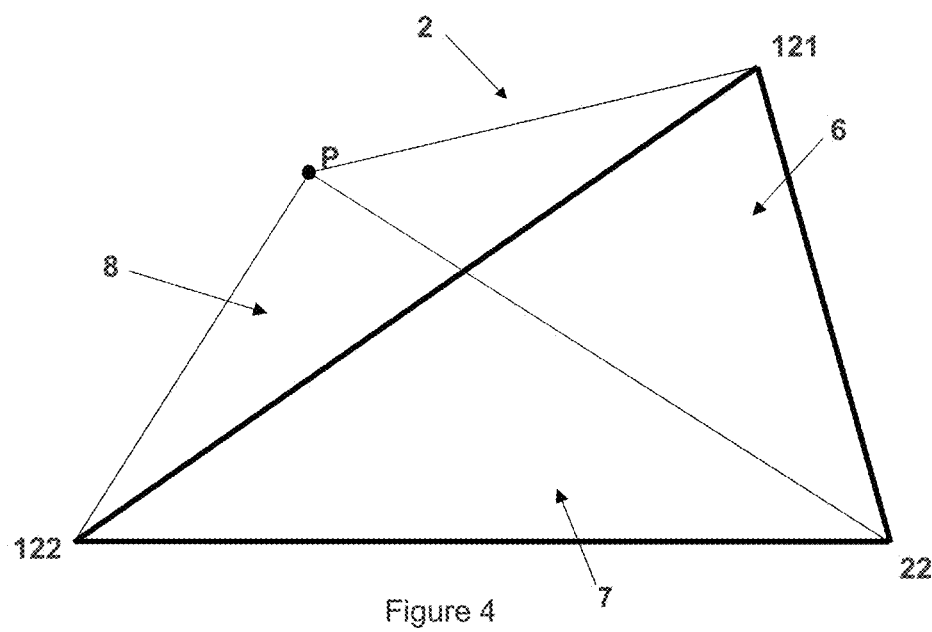
FIG. 4—Illustrative scheme of the navigation method according to this invention.

As seen in the FIG. 1, this invention describes a navigation method that comprises determining the position of an element P in relation to a certain route of a transport mean by land, sea or air, being likely to be fully applied to check, in real time, if a certain route or trajectory is duly followed. Additionally, this invention can be applied to agricultural machines, preferably in planting systems that require real-time checking of the agricultural implement's trajectory to avoid formation of overlapped planted areas (to allow performing a certain action, such as the shut-off of planting rows to avoid formation of overlapped planted areas).

Therefore, a satisfactory and accurate navigation depends on checking if a certain element P (that can be any reference spot: a real object, such as a seed previously planted in a certain land or a virtual spot) is circumscribed to the route. So, the navigation method described herein is easily and accurately performed, to prevent the generation of a "false positive". Moreover, the application of such technique is extremely advantageous, as it does not require a highly robust, large and expensive processing unit.

Thus, the FIG. 1 describes a navigation method that comprises determining the position of an element P in relation to a certain route of a transport mean, wherein said method comprises the steps of:
  registering the route of the transport mean through a navigation device;
  identifying the position of the element P;

segmenting the route D into a plurality of polygonal forms 10 comprising, at least, four vertexes through a processing tool;

checking the space relation between the element P and the polygonal form 10 through a processing tool;

output a result as to the position of an element P in relation to the polygonal form 10;

performing a certain action according to the result of the position of the element P in relation to the polygonal form 10.

In this case, the route can be registered through a GPS or any other navigation unit that uses any other referential geolocation form.

Additionally, in this case, an element P is understood as any reference spot, either virtual or real. A real reference spot can be, for instance, a seed planted at a certain position, in a certain land reserved to vegetable crops.

In a first alternative embodiment, this invention describes a navigation method wherein the polygonal forms are adjacently placed. Preferably, the polygonal forms 10 are placed side by side, to form a continuous set describing the trajectory or route to be traversed by the relevant transport mean.

In a second alternative embodiment, this invention describes a navigation method wherein the step of segmenting the route into a plurality of polygonal forms 10 through a processing tool comprises dividing the route into a plurality of polygonal forms 10 adjacently placed, wherein each polygonal form comprises a limiting perimeter containing a sequence of adjacent spots.

In a third alternative embodiment, this invention describes a navigation method wherein the polygonal form 10 preferably comprises a quadrilateral with vertexes 11, 121, 122, 22 and an internal area. Nevertheless, said polygonal 10 should not be limited to a quadrilateral, but could be any polygonal form likely to be reduced to, at least, a regular triangle.

Additionally, in a fourth alternative embodiment, this invention describes a navigation method, wherein the polygonal form 10 preferably comprises a convex quadrilateral.

In a fifth alternative embodiment, this invention describes a navigation method wherein the step of checking the space relation between the element P and the polygonal form 10 through a processing tool comprises the steps of:

dividing the polygonal form 10 through a first diagonal line that binds two opposite vertexes, so as to include a first triangle 1 with a first vertex 11, a second vertex 121, a third vertex 122 and an area, as well as a second triangle 2 with a first vertex 22, a second vertex 121, a third vertex 122 and an area;

binding the element P to the vertexes of the first triangle 1, to comprise a third triangle 3 with an area, a fourth triangle 4 with an area and a fifth triangle 5 with an area;

binding the element P to the vertexes of the second triangle 2, to comprise a sixth triangle 6 with an area, a seventh triangle 7 with an area, and an eight triangle 8 with an area;

calculating the area of the third triangle, the area of the fourth triangle, the area of the fifth triangle, the area of the sixth triangle, the area of the seventh triangle and the area of the eight triangle;

comparing the area of the first triangle to the result from the first sum S1 of the area of the third triangle, of the area of the fourth triangle and of the area of the fifth triangle;

comparing the area of the second triangle to the result from the second sum S2 of the area of the sixth triangle, of the area of the seventh triangle and of the area of the eight triangle;

processing the result from the comparison between the area of the first triangle and the first sum of areas S1, and the result from the comparison between the area of the second triangle and the second sum of areas S2.

There can be a coincidence between at least a triangle obtained from the connection of element P to the vertexes of the first triangle and at least a triangle obtained from the connection of element P to the vertexes of the second triangle 2.

In a sixth alternative embodiment, this invention describes a navigation method wherein the output result comprises one of the two alternatives: the element P can be associated to the internal area of the polygonal form 10, or the element P can be dissociated from the internal area of the polygonal form 10.

Upon output of the result, this invention allows taking a certain subsequent action, that can vary from the rectification of the navigation route (if the element is outside the polygonal form 10) to the shut-off of a planting row (if the element is inside the polygonal form 10).

Additionally, this invention describes a navigation system that processes the position of an element P in relation to a certain route, wherein the system comprises:

a navigation device;

at least a mean to identify the position of elements;

at least a processing tool.

In a first alternative embodiment, this invention describes a system wherein the navigation device preferably uses geographical references through satellite. Nevertheless, the navigation device can use any other kind of reference.

In a second alternative embodiment, this invention describes a system wherein the device for capturing the element position comprises, at least, a tool to detect the position of a certain element P.

So, this invention solves any inconveniences presented by the inaccurate techniques from prior art, by using a simple, quick and accurate solution to allow taking a certain action from such information.

What is claimed is:

1. A navigation method that comprises determining a position of an element (P) in relation to a certain route to be traversed by a vehicle, wherein said navigation method comprises the steps of:

obtaining, at a navigation device, a route to be traversed by the vehicle;

identifying, by a position identification means, the position of the element (P);

segmenting, through a computer, the route to be traversed by the vehicle into a plurality of polygonal forms (10) comprising, at least, four vertexes;

checking a space relation between the element (P) and one of the plurality of polygonal forms (10) through the computer, wherein checking the space relation comprises the steps of:

dividing, via the computer, the one of the plurality of polygonal forms (10) through a first diagonal line that connects two opposite vertexes, to define a first triangle (1) with a first vertex (11), with a second vertex (121), with a third vertex (122) and with an internal area, as well as a second triangle (2) with a first vertex (22), with a second vertex (121), with a third vertex (122) and an internal area;

connecting, via the computer, the element (P) to the vertexes of the first triangle (1), to define a third triangle (3) with an area, a fourth triangle (4) with an area and a fifth triangle (5) with an area;

connecting, via the computer, the element (P) to the vertexes of the second triangle (2), to define a sixth triangle (6) with an area, a seventh triangle (7) with an area and an eighth triangle (8) with an area;

calculating, via the computer, the area of the third triangle (3), the area of the fourth triangle (4), the area of the fifth triangle (5), the area of the sixth triangle (6), the area of the seventh triangle (7) and the area of the eighth triangle (8);

comparing, via the computer, the area of the first triangle (1) to a result of a first sum of the area of the third triangle (3), of the area of the fourth triangle (4) and of the area of the fifth triangle (5);

comparing, via the computer, the area of the second triangle (2) to a result of a second sum of the area of the sixth triangle (6), the area of the seventh triangle (7) and the area of the eight triangle (8);

processing, via the computer, a result from the comparison between the area of the first triangle (1) and the first sum of areas, as well as the result from the comparison between the area of the second triangle (2) and the second sum of areas;

outputting, via the computer, a result on the position of the element (P) in relation to the one of the plurality of polygonal forms (10) as a result of the comparisons;

correcting the route or shutting-off of planting rows according to the output result on the position of the element (P) in relation to the one of the plurality of polygonal forms (10).

2. The method according to claim 1, wherein the plurality of polygonal forms (10) are adjacent to each other.

3. The method according to claim 1, wherein the step of segmenting the route to be traversed by the vehicle into a plurality of polygonal forms (10), through the computer, comprises dividing the route into the plurality of polygonal forms (10) adjacently placed, wherein each polygonal form of the plurality of polygonal forms (10) comprises a limiting perimeter containing a sequence of adjacent spots.

4. The method according to claim 1, wherein the one of the plurality of polygonal forms (10) comprises a quadrilateral with vertexes (11,121,122,22) and an internal area.

5. The method according to claim 1, wherein the one of the plurality of polygonal forms (10) comprises a convex quadrilateral.

6. The method according to claim 1, wherein the output result comprises one of two alternatives: the element (P) is associated to the internal area of the one of the plurality of polygonal forms (10), or the element is dissociated from the internal area of the one of the plurality of polygonal forms (10).

7. A navigation system to process the position of the element (P) in relation to a certain route that comprises:
- the navigation device;
- the computer including
- means to identify the position of, at least, the element (P) to carry out the steps of the method as defined by claim 1.

8. The navigation system according to claim 7, wherein the navigation device uses geographical references through satellite.

* * * * *